United States Patent [19]

Cheeseman et al.

[11] Patent Number: 4,924,501
[45] Date of Patent: May 8, 1990

[54] DIAL PULSE SELECTION

[75] Inventors: David S. Cheeseman; Arthur J. Wright, both of Ipswich, England

[73] Assignee: British Telecommunications plc, London, United Kingdom

[21] Appl. No.: 331,030

[22] Filed: Mar. 30, 1989

Related U.S. Application Data

[63] Continuation of Ser. No. 934,079, Nov. 24, 1986, abandoned.

[30] Foreign Application Priority Data

Nov. 25, 1985 [GB] United Kingdom ............... 8528951

[51] Int. Cl.⁵ ...................... H04M 3/22; H04M 3/42
[52] U.S. Cl. .................................. 379/201; 379/286; 379/287; 379/342
[58] Field of Search .............. 379/286, 287, 386, 372, 379/31, 342, 105, 238, 237, 236; 375/94; 399/280, 201, 233

[56] References Cited

U.S. PATENT DOCUMENTS

| | | | |
|---|---|---|---|
| 3,879,583 | 4/1975 | Rooks | 379/342 |
| 3,917,913 | 11/1975 | Patten | 379/282 |
| 3,927,264 | 12/1975 | Fish et al. | 379/105 |
| 3,935,392 | 1/1976 | Smith et al. | 379/386 |
| 4,013,838 | 3/1977 | Tsai | 379/104 |
| 4,064,488 | 12/1977 | Chapman | 379/386 X |
| 4,540,855 | 9/1985 | Szlam et al. | 379/377 |
| 4,583,124 | 4/1986 | Tsuji et al. | 379/93 |
| 4,674,115 | 6/1987 | Kaleita et al. | 379/201 |

FOREIGN PATENT DOCUMENTS 0095796  4/1988  Japan ................................. 379/280

OTHER PUBLICATIONS

IBM Technical Disclosure Bulletin, vol. 18, No. 4, Sep. 1975, pp. 991–992, New York, U.S.; C. R. Bringol et al.: "Dial Pulse Detector", the whole document.

Primary Examiner—Thomas W. Brown
Attorney, Agent, or Firm—Nixon & Vanderhye

[57] ABSTRACT

A dial pulse detection system 20 has an analogue input buffer 22, an analogue to digital converter (ADC) 24, a processor 25, and an output buffer 26. Processor 25 operates on the digitally encoded samples produced by ADC 24 from the received signal to achieve detection of the dial pulse signalling data in the received signal. This detection process involves a training process and a recognition process. The training process extracts amplitude and timing characteristics of a first part of the received signal from a dialling instrument. These characteristics are then used to form a template for recognition of subsequent dialled digits. Detected digits are then made available at output buffer 26. Processor 25 includes a facility for sending an error signal to the user to indicate that dialled digits have not been correctly received.

22 Claims, 4 Drawing Sheets

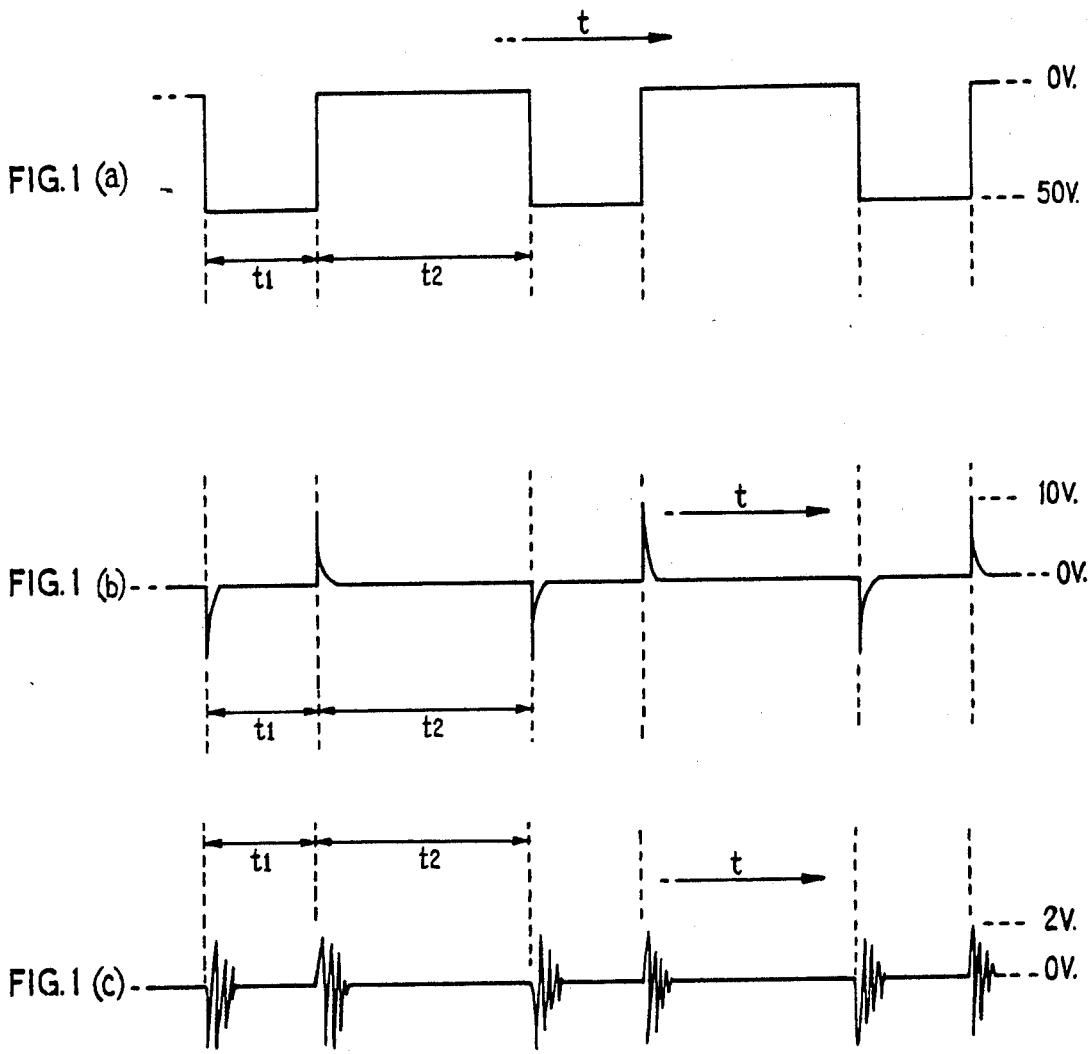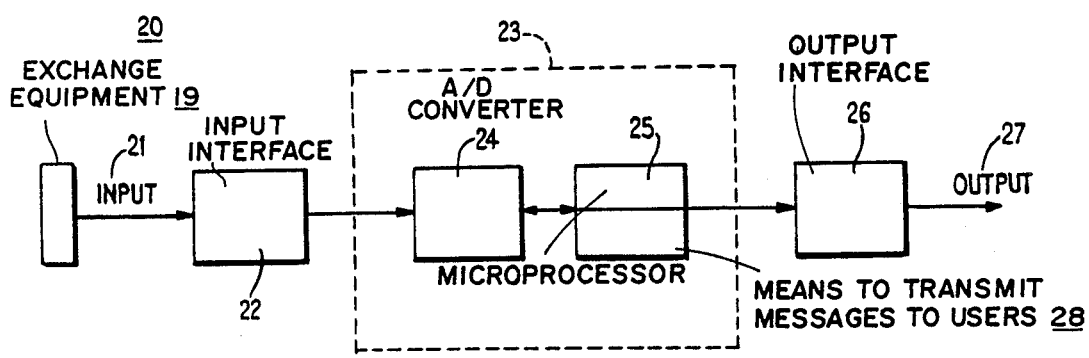

FLOW CHART OF TRAINING ROUTINE

DIAL PULSE SELECTION

This is a continuation of application Ser. No. 06/934,079, filed Nov. 24, 1986, now abandoned.

This invention relates to detection of signalling data such as dial pulse signalling data.

FIELD OF THE INVENTION

In this specification and the appended claims, dial pulse signalling data means the make and break signals commonly produced by telephone dials, the pushbutton equivalent or the like and used in telecommunications systems for control and routing of calls through the telecommunications network.

BACKGROUND AND SUMMARY OF THE INVENTION

In the field of telecommunications, systems for the detection of dial pulse signalling are well known. These systems commonly employ a method of detection based on the observance of rigid amplitude thresholds and signal timing constraints. Such systems have taken many forms, from electromechanical devices using relays to detect the presence of dial pulses, to solid state electronics and microprocessor controlled systems which perform the same function somewhat more economically.

However, a problem arises in that the dc component of dial pulse signalling, used for setting up switch paths in the exchange, is removed at the first transmission bridge encountered in the path. From there on, only the ac component, generated as a consequence of the pulse shape of the dc signalling, is available for detection at various distant points in the network. Moreover, in order to use these ac components to control distant apparatus, they must be detected reliably with adequate discrimination against similarly generated interfering signals (which arise due to cross-talk on telecommunications lines) as well as any other background noise normally present in all electrical circuits.

An added problem, as far as reliable detection of the ac component of the signalling pulses is concerned, is that of timing. In the UK the normal speed of a telephone dial is 10 impulses per second (ips) but because of manufacturing tolerances and wear, a range of 7-12 ips is specified. The variation in the speed of electronically produced dial pulses (such as from a push button telephone) will of course be much less. The effects of amplitude distortion must also be considered, where the amplitude of signalling pulses will vary according to the electrical characteristics of the transmission medium and the distance over which dial pulses are to be detected. The transmission medium will also affect the timing of the signalling pulses.

Prior art systems, therefore, which use as the basis of their detection method, fixed amplitude and timing thresholds, cannot provide a reliable solution to the above problems particularly when attempting to detect pulses at a considerable distance from the sending end.

The present invention provides a method and apparatus for detecting dial pulse signalling data which can be both flexible and reliable in use.

According to a first aspect of the present invention there is provided a method of detecting dial pulse signalling data in a received signal, comprising a training process and a recognition process, wherein the training process comprises processing of a portion of the received signal to extract characteristics of the received signal and said recognition process uses said characteristics to assist in detecting dial pulse signalling data in the received signal.

According to a second aspect of the present invention there is provided a detector for dial pulse signalling data comprising means for processing a portion of a received signal to extract characteristics of the received signal and operable using said characteristics to assist in detecting dial pulse signalling data in the received signal.

According to a a third aspect of the present invention there is provided interactive terminal equipment comprising a detector for detecting digits dialled, said equipment being adapted to transmit messages to the user inviting the user to dial digits according to the user's requirements and to provide a service to the user dependent on the digits dialled.

BRIEF DESCRIPTION OF THE DRAWINGS

A specific embodiment of the invention will now be described, by way of example, with reference to the accompanying drawings in which:

FIGS. 1($a$), 1($b$) and ($c$) are waveform diagrams showing the electrical waveform of idealized dial pulse signals:

Figure 3:
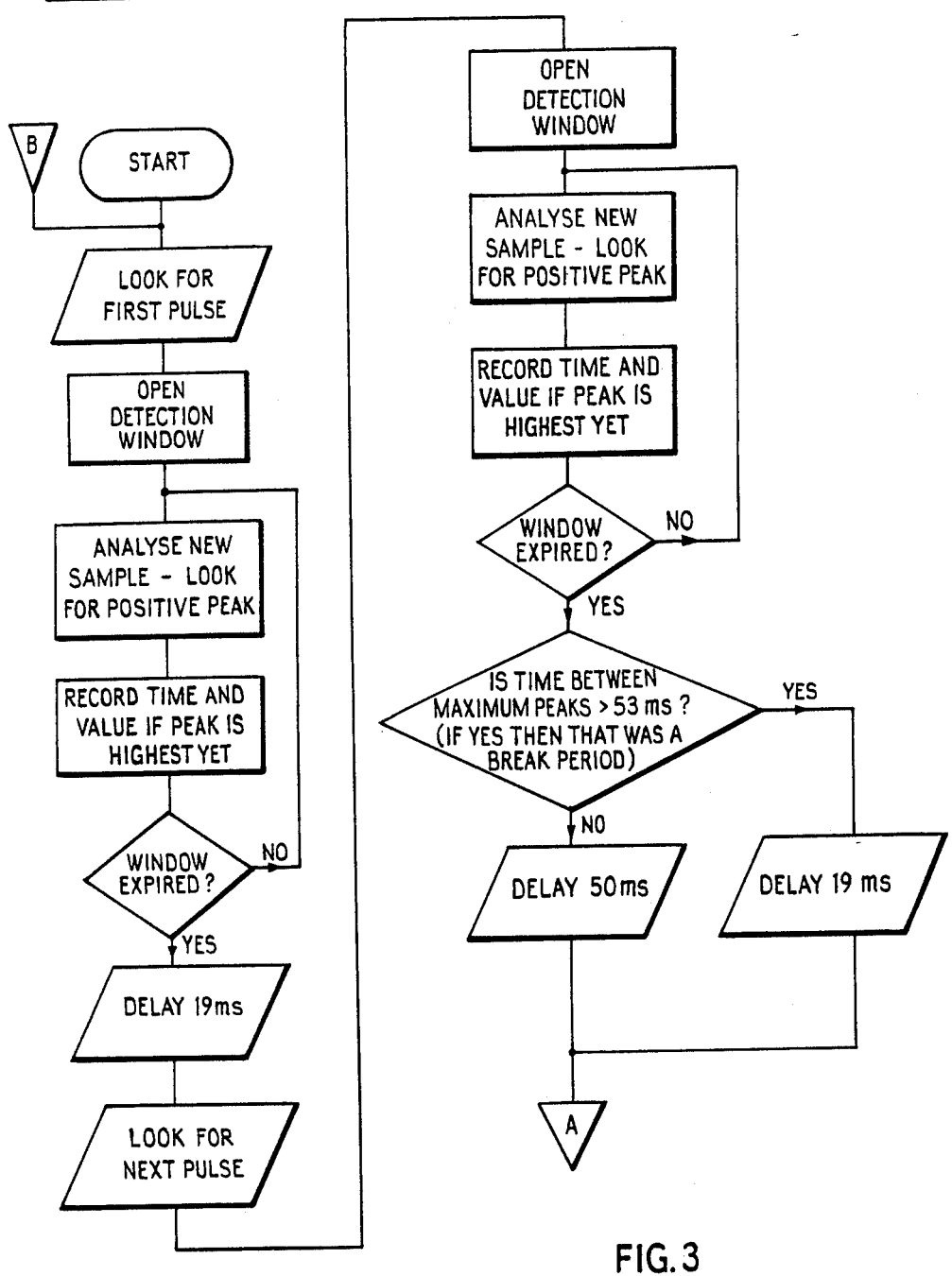
Figure 3:
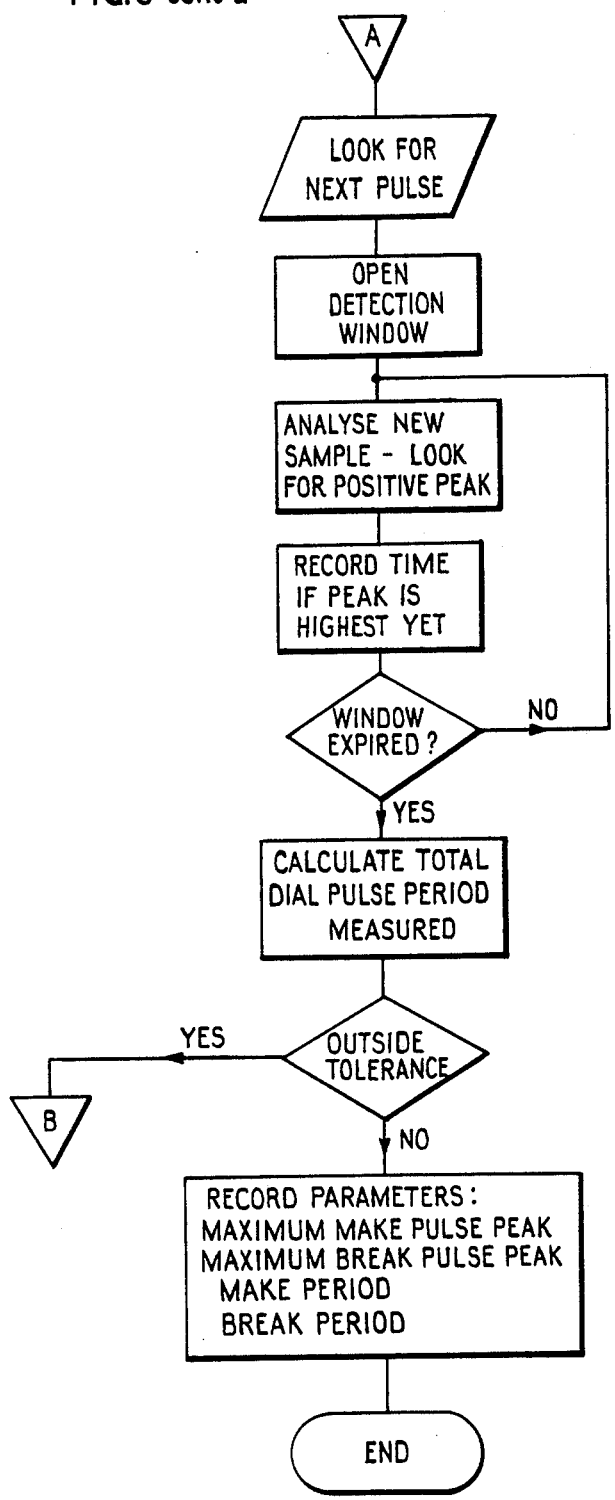
Figure 4:
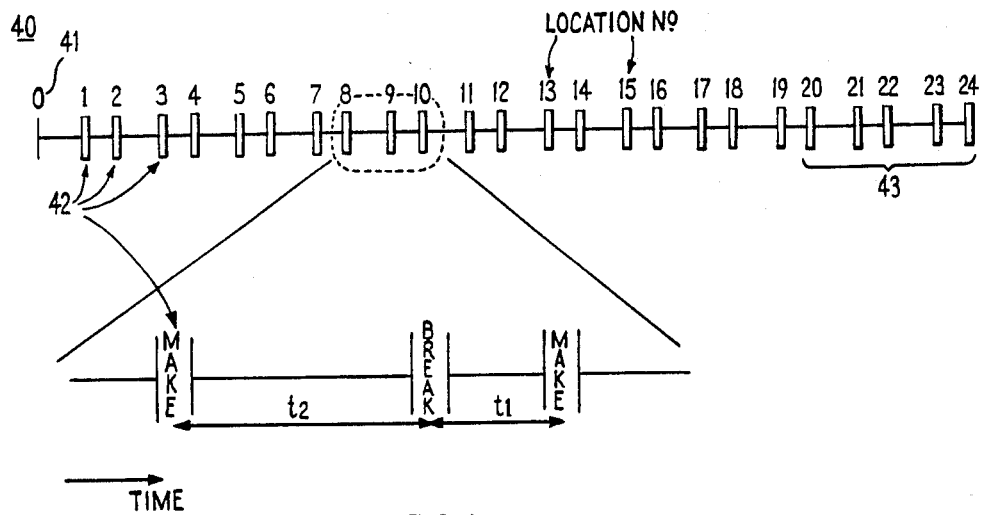
Figure 5:
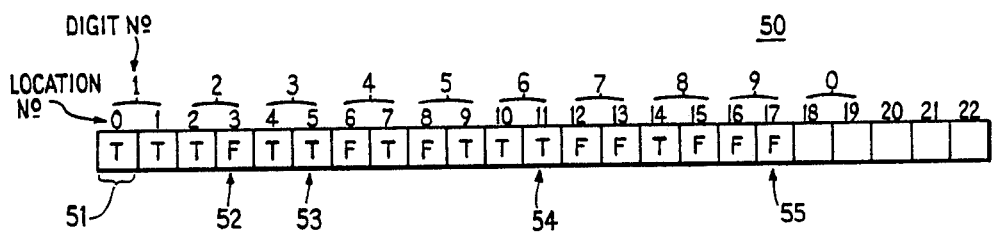

(a) before a first transmission bridge;

(b) after a first transmission bridge; and (c) at a distant receiving end, respectively;

FIG. 2 is a schematic block diagram of a system for implementing the method of detection of dial pulse signalling data according to the invention;

FIG. 3 is a flowchart of the dial pulse training process performed by the system of FIG. 2;

FIG. 4 shows the format of detection windows set up by the system of FIG. 2 and used for performing the dial pulse recognition process; and FIG. 5 shows an example of a pulse array set up by the system of FIG. 2 as a result of the dial pulse recognition process. FIGS. 1($a$), 1($b$), and 1($c$) show idealized versions of the electrical waveforms of analogue dial pulse signals. FIG. 1($a$) shows a portion of dial pulse signalling in its relatively distortion free state before entering a dc block (i.e. before reaching the first relay set of transmission bridge in the local exchange). Time interval $t_1$ represents a make period and interval $t_2$ represents a break period. The make/break period $t_3$ is therefore made up of the sum of the two periods $t_1 + t_2$. Make period $t_1$ is nominally $33\frac{1}{3}$ ms and break period $t_2$ nominally $66\frac{2}{3}$ ms, thus giving rise to a make/break period $t_3$ of 100 ms corresponding to a mean dial pulse signalling rate of 10 impulses per second (ips). There will be a tolerance in the values of intervals $t_1$ and $t_2$ since dial signalling rates may be allowed to vary from 7 to 12 ips thus altering the make/break pulse period $t_3$. Any given dial will produce relatively constant values for periods $t_1$ and $t_2$ but this will vary from dial to dial and from one line to another.

FIG. 1($b$) shows the effect of passing the signals of FIG. 1($a$) through a first transmission bridge (a dc block). FIG. 1($c$) shows idealised ringing distortion due to passing the signal of FIG. 1($b$) along a transmission medium. It should be noted that the wave forms of FIGS. 1($a$)–1($c$) and in particular FIG. 1($c$) will normally be subject to additional random distortion effects (not shown) of background noise and impulsive interference.

Referring to FIG. 2, a dial pulse detection system 20 is shown in which analogue dial pulses of the type shown in FIGS. 1(a) or 1(b) or 1(c) are input at 21 to an input interface 22 from, for example, exchange equipment 19. The analogue dial pulses are then passed to a detector 23. The detector 23 comprises an analogue to digital converter 24 and a microprocessor system 25. The converter 24 converts the analogue dial pulses into digital samples which can be read by the microprocessor 25. Processed output from detector 23 passes via interface 26 and is output at 27. Input and output interfaces (22,26) ensure that all signal levels are compatible and provide protection for detector 23. Input interface 22 also includes a low pass filter (not shown) in order to remove unwanted higher frequency components in the received signal and thereby aid detection.

In operation, the dial pulse detector in FIG. 2 would normally be located at a distant receiving end on a telecommunications line. A user would therefore be able to route his call through the exchange equipment 19 (having dialled the required number in the normal fashion) and would then be able to supply extra dialled digits over the established link to the detector. The detector may therefore be used to detect this dialled signalling information which may in turn be used for control of other equipment to provide a required service to the user. For example dialled digits may be used to control computerized data bases; for implementing automatic operator facilities for PABXs; and in interactive answering machine systems. A typical automatic operator application of the invention in a PABX system would enable an outside exchange line user to dial any extension on the PABX. The detection system 20 would, for example, be located in or before the PABX. A telephone call for the PABX would be intercepted by the detection system which would then play a message to the caller. The detection system would detect additional digits dialled by the user, i.e. the extension number, and pass the detected number on to the PABX equipment to route the call through to the required extension. In a preferred embodiment of the invention, this would be achieved by the user dialling the extension number preceded by a training digit with a long pulse train (e.g. a nine).

The invention may also be easily incorporated in systems requiring interactive detection of dial pulse signalling data and one example of such a system would be an intelligent controller for accessing a computerized data base. The intelligent controller would send instructions generated, for example, by a means for transmitting messages 28 shown in FIG. 2 to be within microprocessor 25, the instructions being transmitted over the exchange line to the user (e.g. to access file X dial 123) who would then respond by dialling the appropriate digits. The dial pulse detection system 20 would then pass the detected digits to the controller in order to initiate the appropriate action. In such a system, security of access could be achieved by ensuring that each user dials a unique number for access to the data base.

With the detector located at a distant receiving end on a telecommunications line, the type of dial pulse signalling available to the detector will be of the form shown in FIG. 1(c). Here, the regular loop/disconnect (make/break) pulses of FIG. 1(a) have been degraded by the transmission bridge and the characteristics of the line into a series of positive and negative going oscillations which decay in time. These oscillations are excited by the transients of FIG. 1(b) which correspond to the rising and falling edges of the original loop/disconnect signal of FIG. 1(a). Additionally, the signal of FIG. 1(c) will also contain noise (not shown) which may take the form of both random impulse interference (mostly due to crosstalk from other lines carrying dial pulses) and general background noise. At a distant receiving end, the amplitude of the signal of FIG. 1 (c) typically varies greatly with a mean peak level of approximately 2 volts and a standard deviation of approximately 1.5 volts. Background noise typically ranges from 50 mV–100 mV with impulsive noise often reaching much larger levels.

The signal of FIG. 1(c), along with associated noise as described above, is therefore input to the detector of FIG. 2 at input interface 22. Input buffer 22 is designed to cope with the above variation in input signal level. Input buffer 22 incorporates a low pass filter in order to reject the unwanted higher frequency components (primarily above 4 kHz) present in the received signal. This low pass filter band limits the received signal to 4 kHz thereby retaining the main part of the signalling information and enabling the subsequent use of an 8 kHz sampling frequency. Additionally, since most of the signalling information is conveyed at frequencies below 2 khZ, removal of higher frequencies by a second low pass filter serves to improve the subsequent detection process (described below). These filtering operations could be combined into one operation. Buffer 22 incorporates gain control circuitry which serves to provide an optimum signal level for operation of the detector 23 and also protects the detector 23 from damage arising from any excessively large voltage transients at the input 21. Buffer 22 also provides dc isolation of the detector 23 from the telephone line at input 21.

The analogue signal then passes to the analogue to digital converter (ADC) 24. ADC 24 is a conventional device which produces digital codes compatible with the input of processor 25. In the present implementation standard A-law encoding is used. However, since maximum negative going peaks in the analogue signal (due to the falling edge of the long break pulse) tend to be larger than any positive going peaks, a digital encoding technique is used which full wave rectifies the received signal by taking magnitude of the received signal as a positive modulus. All analogue voltages are therefore encoded as digital samples having a positive modulus. The samples produced by ADC 24 are then made available for processing by the microprocessor system 25. Processor 25 operates on the samples in two distinct modes to achieve detection of the dial pulse signalling data. The first mode is a training process, and the second mode is a recognition process.

The training and recognition processes performed by processor 25 are described in detail below with reference to FIGS. 3 to 5.

FIG. 3 is a flow chart of the operation of the training process. The purpose of this training process is to obtain a "signature" or template of various signal parameters relating to the dialling instrument to which the detector is to be trained. For this reason, the user would (after a connection to the detector has been established) dial a predetermined digit intended solely for the purpose of training the detector to that dial and line. In this example, the training digit is a nine which gives rise to a train of 9 make/break pulses, giving the detector a good opportunity to train to the signal parameters of the dial and the line. In addition to these signalling pulses, telephone instruments produce extra pulses at the beginning and end of dialling. These are termed "off-normal" pulses and are caused by the switching between voice and dial signalling circuitry within the telephone, and occur as single pulses before and after the make/break pulse sequence.

FIG. 3 shows this training process, in which a template of the parameters of the dial and line is formed using measured signal levels and times. On receiving a stream of training pulses, the processor 25 analyzes the digital samples from ADC 24 which represent the received signal. Processor 25 looks for those samples representing a first maximum peak whereupon a detection window is held open for 9 ms. All samples received while this window is open are analysed and a maximum peak level occuring within this period is recorded. The window is then closed, and there is a delay of 19 ms before any further samples are taken. Following this, another window is opened on detection of the next peak and a maximum peak level obtained within this period is again recorded. Processor 25 calculates the time between these maximum peaks and this parameter is stored. If this time is found to be less than 53 ms, then this is taken to indicate that the interval between the previous two peaks constituted a make period (i.e. $t_1$ ideally $33\frac{1}{3}$ ms as in FIG. 1). There is then a delay of 50 ms before beginning the next analysis in order to await the arrival of the peak representing the end of the subsequent break period (and the beginning of the next make period). Should that time period between the first two peaks be found to be greater than 53 ms, thus indicating the occurrence of a break period (i.e. $t_2$ ideally $66\frac{2}{3}$ as in FIG. 1), then a delay of 19 ms is used before beginning the next analysis which would expect the arrival of a pulse representing the end of a subsequent make period (and the beginning of the next break period). Analysis finishes when the parameters of three pulses (representing a complete make/break period $t_3$ as in FIG. 1) have been recorded. If the total time between first and last pulses is found to be outside a specified tolerance (where this tolerance corresponds to the allowed 7–12 ips rate, i.e. a range of 83 ms to 143 ms) then all data is erased and training is restarted. If not, a template is prepared using the measured break period, make period, maximum peak of break pulse, and maximum peak of make pulse. The periods are measured between the maximum peaks.

The fact that the training process is restarted if the above tolerance is exceeded means that errors which might otherwise arise due to noise pulses in the received signal are eliminated. The system therefore ensures that any pulses due to noise will be ignored since such pulses are essentially of a random nature and will have a different level to those of the dial pulses. Large amounts of noise on the received signal may cause the operation of several training cycles before the dial parameters are successfully obtained. The use of, say, the digit nine for training purposes, allow several training cycles. If for some reason (perhaps due to excessive noise in the received signal, or the use of a faulty dial) detector 23 finds it impossible to train to the dialling instrument, then processor 25 will generate an error signal (which could be in the form of a tone or a standard voice synthesised message) to indicate to the user that there has been a malfunction and that the user should re-dial.

Normally, the user will dial a series of digits, the first of which will be a training digit (for example the digit nine), and subsequent digits are then detected by processor 25 using the parameters obtained from the training digit in the course of the training process. In order to do this, processor 25 begins the recognition process once the training process has been successfully completed. The operation of the recognition process is shown in FIGS. 4 and 5.

The recognition process uses the dial pulse characteristics obtained in the training process to set up a series of analysis windows. Any samples received outside these windows are ignored. The advantage of setting up these analysis windows according to the dial pulse information from the training process is that the width of each window can be made small (9 ms in this example) in comparison to the dial pulse period (an average of 100 ms). In this way only small amounts of signal need be analysed at any one time in order to be certain of receiving valid dial pulses in the presence of impulsive noise. FIG. 4 illustrates the time format 40 of the analysis windows 42 observed by processor 25 after the first make pulse 41 has been received (corresponding to the first pulse of the digits which are to be detected after the training digit). Each analysis window 42 is associated with a location 51 in the pulse-array 50 (of FIG. 5) which is built up progressively and stored by processor 25 to describe the incoming pulse train. The analysis windows 42 are numbered from 0 to 24 where the first window is numbered 0. For clarity, FIG. 4 shows an expanded view of windows 8, 9 and 10. This numbering of the windows 42 corresponds to the numbered locations 51 in the array 50 of FIG. 5. Each location 51 of array 50 stores the result of its correspondingly numbered analysis windows 42. Pulse array 50 corresponds to an example recognition of the dialled digit six.

The analysis windows 42 are opened at regular intervals corresponding to the measured make and break periods ($t_1$ and $t_2$ respectively) from the training process. While each analysis window 42 is open, and this is only for a period of 9 ms, processor 25 compares the amplitude of received samples against the appropriate make or break peak value expected for that particular dial (from the training process). If the amplitude of a sample is found to fall within an acceptable tolerance of the expected peak value, then a valid pulse is determined to have been received, and the correspondingly numbered location in the pulse array 50 of FIG. 5 is flagged true. If an analysis window 42 should time out with no valid pulse being received, then the corresponding element of the pulse array 50 is flagged false. Array 50 of FIG. 5 shows each location 51 flagged in this way, either with a T (i.e. true), or an F (i.e. false).

As soon as either of these conditions occur, processor 25 causes a delay until the next analysis window 42 is due to be opened, where this delay is determined by the appropriate measured $t_1$ or $t_2$ pulse period from the training process. All even numbered locations (0,2,4,6...) in array 50 will hold a true or false result representing a valid or invalid make pulse received (this being so since it is assumed that the first pulse received must be a make pulse). All odd numbered locations (1,3,5,7,...) in array 50 will hold a true or false result representing a valid or invalid break pulse received. Locations (0,1) therefore represent the first dial pulse digit received (i.e. one make and one break), with locations (2,3) representing the second dial pulse received, and so on.

Processor 25 causes the analysis windows 42 to be opened and closed according to the format 40 of FIG. 4, until any of the following conditions are determined to be true:

(1) Any three pulses have been missed, and the number of pulses correctly received is less than four. This condition is used to detect quickly when a noise spike has been received instead of the first make pulse, enabling the processor 25 to reset the system before the correct pulse appears. This mechanism also allows an "off normal" pulse (which occurs one Inter-Digit Pause (IDP) period before the dialling pulses) to be discarded.

(2) Four consecutive pulses have been missed. Processor 25 interprets this as the Inter Digit Pause which represents the minimum pause between dialled digits and has a value of at least 330 ms.

(3) Any five pulses have been missed. Probably due to an IDP with a noise spike triggering a single valid pulse condition.

(4) More than 22 analysis windows have been opened. Although this is unlikely, it is possible that noise spikes would prolong the pulse train, thereby giving an erroneous result if detection ended abruptly after 20 pulses (i.e. 10 makes and 10 breaks which represents the dialled digit zero). This small additional margin acts as an aid in the detection of errors (see below).

To implement the detection of conditions (1) to (3), processor 25 operates a missed pulse counter which is incremented on every failure to recognise a valid pulse in each analysis window. Processor 25 resets this missed pulse counter on each occurrence of two consecutive correctly received pulses, under the assumption that noise spikes, being essentially random in nature, are unlikely to cause this effect and processor 25 therefore determines that, since the pulse train is still being received, all previous missed pulses were mistakes. Errors will also be detected which arise from any pulses being received in windows 20 to 24 (area 43 in FIG. 4) which cause any of locations 20 to 24 to be flagged true. Processor 25 therefore determines that such locations flagged true must be due to noise since no valid digits greater than the digit zero can be received.

When the above procedure is complete and the pulse array has been compiled, processor 25 determines the value of the received digit by searching backward through the pulse array for the first occurrence of two consecutive correctly received pulses which correspond to a valid digit received. It then calculates the number dialled from the position in the array that this occurs. FIG. 5, therefore, shows one example of the state of the pulse array 50 after reception of the dialled digit 6 where locations (10, 11) hold the last consecutively valid entries which correspond to the dialled digit 6. In this example, 52 of FIG. 5 shows location 3 which is the first to be flagged false. The missed pulse counter operated by processor 25 therefore records one missed pulse. However 53 shows the digit 3 which is subsequently correctly received (locations 4 and 5 flagged true) and the missed pulse count is therefore reset to 0 (as described above). Similarly, missed pulses in locations 6 and 8 increment the missed pulse count to two but this is then reset at 54 by the valid pulses in locations 10 and 11. Locations 12, 13, 15, 16 and 17 are then flagged false, with only a single valid pulse being indicated at location 14, which indicates that a fifth pulse has been missed without correction. This condition causes processor 25 not to open any more analysis windows (i.e. window 18 is not opened) and the processor determines that all pulses in the dialled digit have been received and that an Inter Digit Pause has just been received (from condition 2 above). Processor 25 then searches the array 50 by working back from 55 (location 17—the last one flagged) to find the first instance of consecutive valid pulses (i.e. flagged true). In this example this first occurs at 54 (locations 10 and 11).

Since locations 10 and 11 correspond to the dialled digit six, processor 25 determines that the dialled digit was in fact a six and no further locations are searched. In this example, if location 12 was also true, and 13 false, then the dialled number would still be recognized as a six (with the location 13 being ignored as a single error pulse). This condition will also prevent an "off-normal" pulse (which occurs after the dialling pulses) being treated as a dial pulse. This "off-normal" pulse occurs at approximately one break period after the last make dial pulse transient and thus could be recognised as a valid break pulse transient. If location 12 was false and locations 13 and 14 true then the digit received would still be recognised as a six since the rule of two consecutive true locations implying a valid pulse period can only apply in locations corresponding to a digit value (i.e. 0 and 1, 2 and 3, 4 and 5 . . . etc.) and not in locations falling between digit values (i.e. 1 and 2, 3 and 4, etc.).

The recognition process therefore employs error detection and correction embodied in the missed pulse counter and its reset by processor 25 according to the above conditions.

If, for some reason, it is not possible for processor 25 to perform a satisfactory recognition process (as in, for example, condition 4 above) then the processor will cause a malfunction signal to be sent to the user in the form of a tone or a voice synthesized message in order that the user will understand that the number is to be redialled.

Once the recognition process has been performed successfully on a dialled digit, processor 25 passes its numerical value to output buffer 26 (shown in FIG. 2) where it is made available at the output 27 for use by other equipment as described above. Processor 25 is then ready to repeat the recognition process on any subsequent digits dialled by the user. When all digits have been successfully received, processor 25 will also cause a voice synthesized message to be sent to the user to confirm the value of the dialled digits received and stored in buffer 26.

In the specific embodiment described above, the training process is carried out on a predetermined training digit which is used solely for training purposes and is not intended to be recognised by the system. Alternatively, the training process could be "implicit" and form part of the recognition process thus obviating the need for a separate training digit. In this case, the first digit would be used to train the detector to the dialling instrument, but would at the same time be itself recognised by the detector as well as being used as a basis for recognition of subsequent digits. This implicit training would require the first attempt at recognition to have the widest tolerances on pulse parameters which would have to be according to an average or optimum setting based on experience. Subsequent dialled digits would, however, be recognised according to a template prepared from the measured parameters of the first digit received.

If desired, further parameters may be extracted from the dial pulses during training to assist in detection. One such parameter is the polarity of the first peak in the transient which indicates whether a transient was generated by a make or break pulse. Also, the number of zero crossings in the ringing of the transient (i.e. the number of oscillations) could be used to improve immunity against noise.

In the training process, it may be advantageous to provide default values for the dial pulse parameters, so that some or all of the default values can be used if the training is incomplete or unsuccessful.

Another option is to analyze the received signal between the detection windows to compare the level of the signal with the level of the make or break pulses measured during training. The detector can be made to ignore continuous signals such as speech which could otherwise cause false recognition.

Although a dial pulse detection system has been described which performs analogue to digital conversion of the received analogue signal in order to process the signal in digital form, it is of course operable without such conversion in situations (such as in a wholly digital network) where the detector can be directly presented with the signal in digital form.

Additionally, further measures can be taken to improve the performance of the detector 25 when dealing with received signals known to have a very poor signal to noise ratio. Such measures may include the use of additional signal pre-processing at the input buffer stage 22. This pre-processing could take the form of analogue or digital filters to enhance the signal to noise ratio of the received signal and thus provide for optimum operation of the detector.

We claim:

1. A method of detecting dial pulse signalling data in a received signal comprising the steps of:
    performing a training process to train a dial pulse detector by processing a known dialled signal to extract information relating to the timing of the dialled pulses in a known dialled digit; and
    performing a recognition process by using said information to assist said detector in detecting dial pulse signalling data in the received signal, wherein said information includes measured values for a maximum make pulse level, a maximum break pulse level, a make period, a break period, and a total dial pulse period.

2. A method of detecting dial pulse signalling data as claimed in claim 1, wherein the training process is restarted if a value obtained for the total dial pulse period is outside of a given tolerance.

3. A method of detecting dial pulse signalling data as claimed in claim 1, wherein the recognition process comprises measuring the maximum make pulse level of received signals during time periods spaced according to the measured spacing of pulses during the training process.

4. A method of detecting dial pulse signalling data as claimed in claim 3, wherein said time periods are less than 25 milliseconds.

5. A method of detecting dial pulse signalling data as claimed in claim 3, wherein the recognition process includes comparing the level of received signals during said time periods with the pulse levels derived from the training process to detect the presence or absence of valid dial pulses.

6. A method of detecting dial pulse signalling data as claimed in claim 5, wherein the recognition process includes storing information upon the detection of the presence or absence of valid dial pulses for each time period in respective locations of a data store.

7. A method of detecting dial pulse signalling data as claimed in claim 3, wherein said recognition process is terminated and/or re-started according to a count of pulse absences.

8. A method of detecting dial pulse signalling data as claimed in claim 7, wherein said count of pulse absences is reset by subsequent detection of the presence of at least two consecutively valid dial pulses.

9. A method of detecting dial pulse signalling data as claimed in claim 6, wherein said recognition process derives a detected value of a dialled digit by examination of the information stored in the locations of the data store representing at least two consecutively valid dial pulses.

10. A method of detecting dial pulse signalling data in a received signal comprising the steps of:
    performing a training process to train a dial pulse detector by processing a signal known to be a dialled signal; said step of performing a training process including the steps of extracting timing information relating to the dialled pulses in a dialled digit in said dialled signal and processing said timing information; and
    performing a recognition process by using said processed timing information to assist said detector in detecting dial pulse signalling data in the received signal.

11. A method of detecting dial pulse signalling data as claimed in claim 10, wherein if the training process fails to extract said timing information from said received signal, the training process will transmit a failure message.

12. A method of detecting dial pulse signalling data as claimed in claim 10, wherein said recognition process includes transmitting a message to indicate the detected dial pulse signalling data.

13. A method of detecting dial pulse signalling data as claimed in claim 10, wherein the received signal comprises digitally encoded representations of telephone dial pulses.

14. A method of detecting dial pulse signalling data as claimed in claim 13 wherein said received signal processed by the training process comprises representations of at least four dial pulses.

15. A method of detecting dial pulse signalling data as claimed in claim 10, wherein said step of performing a training process includes the step of measuring time intervals between successive peak signals and storing time information relating thereto.

16. A method of detecting dial pulse signalling data as claimed in claim 15, wherein said step of performing a training process includes the step of measuring an amplitude relating to the peak of the signals and storing amplitude information relating thereto.

17. A method of detecting dial pulse signalling data as claimed in claim 15, wherein the step of performing a training process includes the steps of detecting the presence of erroneous signalling information from the stored time information, erasing the stored time information, and restarting the training process using further received signals.

18. A method of detecting dial pulse signalling data as claimed in claim 15, further including the step of providing a series of analysis windows computed from the stored information for use in the recognition process.

19. A method of detecting dial pulse signalling data as claimed in claim 18, further including the step of determining during each analysis window whether a signal has been received corresponding to that anticipated as a result of the training process and if so storing an indication thereof.

20. A detector for dial pulse signalling data comprising:

means for processing a received signal including training means and recognition means, said training means including means for processing a signal known to be a dialled signal to extract and process timing information relating to the dialled pulses in a dialled digit in said dialled signal, and said recognition means including means for operating on said processed timing information to assist in detecting dial pulse signalling data in the received signal.

21. Interactive terminal equipment comprising a detector for detecting dialled digits comprising means for processing a received signal including training means and recognition means, said training means comprising means for processing a signal known to be a dialled signal to extract timing information relating to the dialled pulses in a dialled digit in said dialled signal, said recognition means including means for using said timing information to assist in detecting dial pulse signalling data in dialled digits, and including means to transmit messages to a user inviting the user to dial digits according to the user's requirements and to provide a service to the user dependent on the digits dialled.

22. Interactive terminal equipment as claimed in claim 21, wherein the equipment is associated with an exchange to provide an automatic operator service so that an outside exchange line user is able to dial any extension on the exchange.

* * * * *

UNITED STATES PATENT AND TRADEMARK OFFICE
CERTIFICATE OF CORRECTION

PATENT NO. : 4,924,501

DATED : May 8, 1990

INVENTOR(S) : Cheeseman et al

It is certified that error appears in the above-identified patent and that said Letters Patent is hereby corrected as shown below:

```
Title of the Invention, delete "DIAL PULSE SELECTION" and
insert -- DIAL PULSE DETECTION --.

Column 1, line 2, delete "DIAL PULSE SELECTION" and
insert -- DIAL PULSE DETECTION --.
```

Signed and Sealed this

Twentieth Day of August, 1991

Attest:

HARRY F. MANBECK, JR.

*Attesting Officer*      *Commissioner of Patents and Trademarks*